United States Patent [19]

Davies et al.

[11] Patent Number: 4,849,464
[45] Date of Patent: Jul. 18, 1989

[54] COATING COMPOSITIONS

[75] Inventors: Stephen P. Davies, High Wycombe Bucks, England; Susan M. Horley, Langenfeld, Fed. Rep. of Germany; Margaret J. Westby, Chinnor Oxfordshire, England

[73] Assignee: Imperial Chemical Industries, London, England

[21] Appl. No.: 144,720

[22] Filed: Jan. 14, 1988

Related U.S. Application Data

[63] Continuation of Ser. No. 932,099, Nov. 18, 1986, abandoned.

[30] Foreign Application Priority Data

Dec. 5, 1985 [GB] United Kingdom ............... 8530025

[51] Int. Cl.$^4$ ..................... C08K 5/06; C08F 2/30; C08F 20/10
[52] U.S. Cl. .................................. 524/375; 523/406; 524/188; 524/376; 524/377; 524/504; 524/505
[58] Field of Search ........ 523/406; 524/188, 375–377, 524/504, 505

[56] References Cited

U.S. PATENT DOCUMENTS

| | | | |
|---|---|---|---|
| 3,316,966 | 5/1967 | Dear, Jr. ................. | 166/295 |
| 4,209,435 | 6/1980 | Backhouse et al. ...... | 524/504 |
| 4,304,693 | 12/1981 | Boberski et al. ........ | 524/556 |
| 4,336,177 | 6/1982 | Backhouse et al. ...... | 524/533 |
| 4,367,298 | 1/1983 | Abbey et al. ........... | 523/402 |
| 4,385,164 | 5/1983 | Sinclair ................. | 526/201 |
| 4,427,820 | 1/1984 | Backhouse et al. ...... | 524/504 |
| 4,539,363 | 9/1985 | Backhouse ............. | 524/460 |
| 4,587,290 | 5/1986 | Davies et al. .......... | 524/558 |
| 4,621,112 | 11/1986 | Backhouse et al. ...... | 524/437 |

FOREIGN PATENT DOCUMENTS 976680 10/1975 Canada .
2039497 8/1980 United Kingdom .

OTHER PUBLICATIONS

Chemical Abstracts, vol. 77, 1972, Abstract 76822c.
Chemical Abstracts, vol. 101, Oct. 1, 1984, Abstract 101:112522g.

Primary Examiner—Herbert J. Lilling
Attorney, Agent, or Firm—Cushman, Darby & Cushman

[57] ABSTRACT

This invention provides a water-borne coating composition comprising a sterically stabilised dispersion in an aqueous medium of a non-ionic film-forming polymer containing oxirane groups and an aminosilane of formula (1)

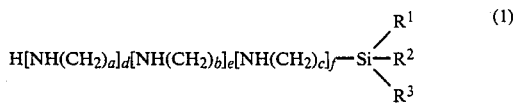

where
a, b and c are from 2 to 4;
d and e are from 0 to 3
f is from 1 to 3;
$R^1$ is $C_{1-3}$ alkyl or $C_{1-3}$ alkoxy and
$R^2$ and $R^3$ are $C_{1-3}$ alkoxy.

19 Claims, No Drawings

COATING COMPOSITIONS

This is a continuation of application Ser. No. 932,099, filed Nov. 18, 1986, which was abandoned upon the filing hereof.

This invention relates to water-borne coating compositions that cure at moderate temperatures.

Water-borne coating compositions that cure at moderate temperatures typically consist of an aqueous dispersion of a polymer that has reactive groups and a cross-linking agent that reacts with the reactive groups to produce a cured coating. When the cross-linking agent is added to the polymer dispersion, the curing reaction begins in the mixture so obtained and the period during which the mixture remains fluid is therefore limited. A coating composition of this type is usually supplied in a two-part pack where one part contains the polymer and the other part contains the cross-linking agent. The polymer and the cross-linking agent are mixed immediately before use.

One solution to the problem of providing coating compositions of the type described above but which remain fluid for relatively long periods is described in U.S. Pat. No. 4,367,298. There is described here, a low temperature cure, one-package stabilised aqueous dispersed co-reactive polymer composition comprising a water-insoluble polymer having reactive amine groups and a water-insoluble polymer having reactive oxirane groups. When applied to a surface, the water evaporates and the amine and oxirane groups react to effect curing. The one-package system described here is stable because the amine- and oxirane-bearing polymers are completely insoluble in water.

It has now been found that it is possible to prepare a coating coaposition comprising a polymer having oxirane groups and a water-soluble cross-linking agent having amino groups, that is stable during storage for surprisingly long periods, but when applied to a surface undergoes a cross-linking reaction at moderate temperatures.

According to the present invention there is provided a water-borne coating composition comprising a sterically stabilised dispersion in an aqueous medium of a non-ionic film-forming polymer containing oxirane groups and an aminosilane of formula (1):

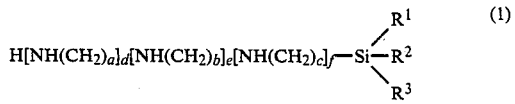

where
a, b and c are from 2 to 4;
d and e are from 0 to 3
f is from 1 to 3;
$R^1$ is $C_{1-3}$ alkyl or $C_{1-3}$ alkoxy and
$R^2$ and $R^3$ are $C_{1-3}$ alkoxy.

Besides being surprisingly stable during storage, the compositions of this invention have the further advantages that they are relatively more adhesive to glass surfaces and, for a water-borne composition have a relatively superior glossy appearance even on spray application.

In practice, the sterically stabilised non-ionic film-forming polymer consists of an addition polymer, the chain of which comprises functional units, each of which contains an oxirane group, and structural units derived from one or more ethylenically unsaturated monomers not containing oxirane groups, and associated therewith a steric stabilising agent for the polymer.

In practice the polymer contains at least 5% by weight of functional units containing oxirane groups. Preferably the polymer contains from 15% to 30% by weight of functional units. Preferably the polymer contains about 23% by weight of functional units.

Examples of functional units containing oxirane groups are those derived from monomers such as glycidyl acrylate or glycidyl methacrylate.

Examples of structural units derived from ethylenically unsaturated monomers include acrylic monomers such as methyl methacrylate, ethyl methacrylate, butyl methacrylate, methoxypropyl methacrylate, cyclohexyl methacrylate, benzyl methacrylate, hydroxyethyl methacrylate, hydroxypropyl methacrylate, methyl acrylate, ethyl acrylate, butyl acrylate, 2-ethylhexyl acrylate, hydroxybutyl acrylate, N-butoxymethyl acrylamide, N-butoxymethyl methacrylamide, vinyl monomers such as vinyl acetate, vinyl propionate, styrene, vinyl toluene, methoxystyrene and vinyl pyridine, and halogenated vinyl monomers such as vinyl chloride and vinylidene chloride.

Preferably the structural unit is derived from methyl methacrylate and butyl acrylate.

The steric stabilising agent for the disperse phase film-forming polymer can be one of two types. On the one hand, it can be a molecule which is preformed and is separate from the film-forming polymer for example, a non-ionic surfactant or a block or graft co-polymer, at least one polymeric component of which is solvatable by the aqueous medium of the dispersion and another polymeric component which is not solvatable with that medium and is associated with the disperse phase polymer. On the other hand, it can be a component that is incorporated by covalent bonding into the film-forming polymer.

Where the stabilising agent is preformed and separate, it can be for example a block or graft co-polymer, where the solvatable component consists of a poly(oxyethylene) chain and the non-solvatable component consists of an addition polymer chain of similar composition to the disperse polymer. The solvatable component of the stabiliser can consist of a poly(oxyethylene) chain, that is, it can be derived from polyethylene glycols and their mono-Cl-4 alkyl ethers, poly(ethylene oxide)-poly(propylene oxide) co-polymers containing at least 40% of ethylene oxide and the mono alkyl ethers of such compounds, polyvinylpyrrolidone, polyacrylamide, polymethacrylamide, polyvinylalcohol and poly-bis(hydroxy ethyl) methacrylamide.

Where the steric stabilising agent is a non-ionic surfactant it can be in particular an alkylphenolpolyethoxylate for example nonylphenol polyethoxylate of molecular weight 900.

The use of preformed steric stabilisers is described in British Patent Specification No. 2039497.

Where the steric stabilising agent is a component that becomes incorporated into the film-forming polymer by co-valent bonding it can be derived from a precursor compound containing in the molecule a water-soluble polymer component that is soluble in the aqueous phase (and from which the solvatable component of the stabiliser is derived) and an ethylenically unsaturated component that undergoes co-polymerisation with some or all of the monomers that are polymerised to form the film-forming polymer.

The water-soluble polymer component in the precursor compound can be derived from any one of those polymers described above in connection with preformed block or graft co-polymers. Preferably the water-soluble polymers are again the polyethylene glycols or their mono alkyl ethers, of molecular weight in the range 700–4,000.

The precursor compound can be a simple unsaturated derivative of a polyethylene glycol or its mono alkyl ether or a more complex molecule which itself has surfactant properties.

Examples of simple unsaturated derivatives of polyethylene glycols and their mono alkyl ethers are esters with co-polymerisable unsaturated acids particularly methacrylic acid, itaconic acid and maleic acid. The formation of steric stabilisers in this way is described in British Patent Specification No. 2,039,497A.

A particular example of such a precursor is the methacrylic acid ester of the monomethyl ether of polyethylene glycol of molecular weight 2,000.

Preferably such stabilser precursors are used with a non-ionic surfactant to assist in the polymerisation reaction.

Where the precursor itself has surfactant properties, typically the molecule has three structural features.

Firstly, it has a component of molecular weight of at least 400, preferably at least 1,000 which is soluble per se in the aqueous phase of the polymerisation mixture; that is, it has hydrophilic character and if it were not attached to the rest of the precursor molecule, would actually be soluble in the aqueous phase. Examples include in particular, those derived from polyethylene glycols, or their monomethyl ethers, of molecular weight in the range 700–4000, but there may also be used those derived from poly(ethylene oxide)-poly(propylene oxide) co-polymers containing at least 40% of ethylene oxide and their monomethyl ethers, polyvinylpyrrolidone, polyacrylamide, polymethacrylamide, polyvinyl alcohol and poly[bis(hydroxyethyl)methacrylamide].

Secondly, it has a component of molecular weight 150–1000 which is per se soluble in the monomer phase of the polymerisation mixture. That is, it has hydrophobic character. Suitable such components include chains derived from the self-condensation or co-condensation of propylene oxide, butylene oxide or styrene oxide, or hydrocarbon chains such as those derived from higher fatty acids or fatty alcohols.

These first and second components together confer the surface-active properties on the compound which are required for emulsification of the monomer or monomers.

Preferably the first, or hydrophilic, component and the second, or hydrophobic, component should be present in a weight ratio lying in the range from 20:1 to 1:1.

The third feature of the surface-active compound, which is attached to or is integral with the second or hydrophobic component, is an unsaturated grouping capable of copolymerising with the monomer or monomers being polymerised. Preferably the unsaturated grouping is attached to or is integral with the portion of the hydrophobic or monomer phase-soluble component which is most remote from the hydrophilic or aqueous phase-soluble component.

Where the hydrophobic component is a polymer chain containing a hydroxyl group, for example a poly(oxybutylene) chain terminated by such a group, the unsaturated grouping may conveniently take the form of the ester of the component in question with a copolymerisable unsaturated acid, such as methacrylic acid, itaconic acid or maleic acid. The production of such an ester may consist in carrying out an ester-interchange reaction between a lower alkyl ester of the acid, for example methyl methacrylate, and the compound constituting the remainder of the precursor molecule, e.g. the monomethyl ether of a poly(oxyethylene)-poly(oxybutylene) copolymer. Such an ester may also be obtained by reacting the copolymer with a suitable unsaturated acid chloride, e.g. methacrylyl chloride, in the presence of a hydrogen chloride acceptor.

One example of a suitable surface-active compound for use in the process of the invention is the unsaturated block copolymer of the formula (2):

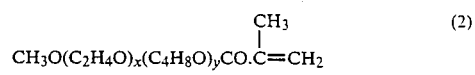

where x and y have values corresponding to molecular weight for the poly(oxyethylene) and poly(oxybutylene) blocks of 2000 and 7000 respectively. This substance is readily obtained by condensing methanol with ethylene oxide and subsequently with butylene oxide in the requisite proportions, and then reacting the product with methacrylyl chloride, or carrying out an ester interchange reaction between the product and methyl methacrylate in the presence of a catalytic amount of tetra-isopropyl titanate.

Alternatively, a suitable surface-active compound may be obtained by the successive condensation of, for example, butylene oxide and ethylene oxide with a hydroxylic compound already containing the requisite copolymerisable unsaturated grouping. For example, allyl alcohol may be condensed successively with butylene oxide and with ethylene oxide to give a block copolymer of the formula (3):

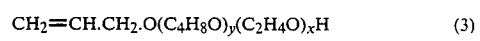

where x and y have the same values as above.

Preferably the triallyl ether of pentaerythritol may be condensed successively with 2 molar proportions of butylene oxide and 35 molar proportions of ethylene oxide and produces a product having the formula (4):

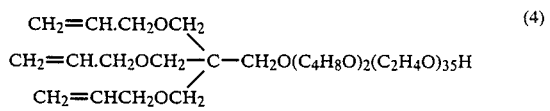

Sterically stabilised dispersions of non-ionic film-forming polymers derived from precursors of this type can be prepared as described in British Patent Specifications Nos. 2 124 636A and 2 127 835A.

Referring to the aminosilanes of formula (1), examples of values for a, b and c are 2, 3 and 4. Preferably a is 2. Preferably b is 2 and preferably c is 3.

Examples of values for d and e are 0, 1, 2 and 3. Preferably d is 0, and preferably e is 0 or 1.

Examples of values for f are 1, 2 and 3. Preferably f is 1. Examples of $C_{1-3}$ alkyl groups for R are methyl, ethyl and n-propyl.

Examples of $C_{1-3}$ alkoxy groups for $R^2$ and $R^3$ are methoxy, ethoxy and n-propoxy. Preferably $R^1$ is $C_{1-3}$ alkoxy.

Preferably $R^1$, $R^2$ and $R^3$ are the same and represent methoxy or ethoxy.

Examples of particular aminosilanes of formula (2) are:
3-aminopropyl-trimethoxysilane,
3-aminopropyl-methyl-diethoxysilane,
3-aminopropyl-triethoxysilane,
N-(2-aminoethyl)-3-aminopropyltrimethoxysilane, and
N-(2-aminoethyl)-3-aminopropyl-methyl-dimethoxysilane.

The amino-silanes of formula (1) are known or can be made by analogy with known processes and some (particularly those referred to above by name) are available commercially.

The compositions of this invention can be prepared by mixing the aminosilane and an aqueous dispersion of the polymer.

Preferably the film-forming polymer containing oxirane groups is reacted with a strong acid which does not interfere with the stabilisation of the dispersion, prior to its being reacted with the aminosilane of formula (1). This is particularly so when d and a in formula (1) are both zero. Preferably the acid is hydrochloric acid.

Preferably also the aminosilane is used in the form of an aqueous solution and preferably the aqueous solution has a concentration of 33% w/w.

The compositions of this invention can be used to coat surfaces by applying a film to the surface by standard techniques for example by dipping or with a brush or roller or with a spray-gun and then allowing the water to evaporate.

The following Examples illustrate the invention.

EXAMPLES

EXAMPLE 1

(a) In this Example and the following Examples, an aqueous dispersion of polymer is made by a "seed and feed" process. In this process a small portion of monomers are dispersed in an aqueous medium and polymerised to form a dispersion of small polymeric particles or "seeds". When the formation of these seeds is complete, the remainder of the monomers to be polymerised are added or "fed" at a rate approximately equivalent to the rate of the polymerisation reaction.

(b) The following charges were made up:
(i) Aqueous charge

| De-ionised water | 450 g |
|---|---|
| Surfactant A | 6.6 g |

Surfactant A is an 80% w/w solution in water of a nonyl-phenol (1 mole) ethylene oxide (20 moles) polycondensate.

(ii) Seed monomer charge

| Methyl methacrylate | 30 g |
|---|---|
| Butyl acrylate | 30 g |

(iii) Seed Initiator
Aqueous solution of ascorbic acid (0.15g) in de-ionised water (7.5g)
Aqueous solution of hydrogen peroxide (20 vol; 1.44g) in de-ionised water (7.5g).

(iv) Monomer Feed I

| Methyl methacrylate | 159 g |
|---|---|
| Butyl acrylate | 225 g |
| Glycidyl methacrylate | 126 g |
| Surfactant A | 18.0 g |

(v) Monomer Feed II

| Methyl methacrylate | 27 g |
|---|---|
| Butyl acrylate | 39 g |
| Glycidyl methacrylate | 24 g |

(vi) Precursor Solution

| De-ionised water | 75 g |
|---|---|
| Precursor A | 18 g |

Precursor A is a polycondensate of pentaerythritol-triallyl ether (1 mole) with butylene oxide (2 moles) and ethylene oxide (35 moles).

(vii) Feed Initiator
Aqueous solution of ascorbic acid (1.56g) in de-ionised water (114g)
Aqueous solution of hydrogen peroxide (20 vol; 14.98g) in de-ionised water (99g).

(c) The seed monomer charge was added with continuous stirring to the aqueous charge at 40° C. under nitrogen. When the addition had been completed, the temperature of the mixture so obtained was allowed to settle with continuous stirring to 40° C. The aqueous solutions of ascorbic acid and hydrogen peroxide forming the seed initiator were added with stirring.

(d) When the polymerisation reaction so induced was over Monomer Feed I was added continuously with stirring over 170 minutes. The precursor solution was added in one portion with stirring and Monomer Feed II was then added continuously with stirring over 30 minutes. The ascorbic acid solution and hydrogen peroxide solution forming the Feed Initiator were added continuously throughout this 200 minute period. When the addition was over, stirring was continued for a further 1 hour.

The aqueous dispersion of polymer made in this way contained less than 0.1g coagulum and on examination using an electron microscope had a particle size of approximately 150 nm.

(e) A composition comprising amino silane and an oxirane group-containing polymer was prepared by adding a solution of 2-aminoethyl-3-aminopropyltrimethoxysilane (33% w/w in de-ionised water; 5g) with stirring to a portion (20 g) of the aqueous dispersion of polymer prepared as described above The mixture so obtained remained stable for 9 months. When applied to a surface, the composition formed a cross-linked coating. The resistance of the film was such that at a thickness of 25 m it was resistant to 100 double rubs of a methylethylketone-soaked rag even after storage.

EXAMPLE 2

(a) The following charges were made up:
(i) Aqueous charge

| | parts |
|---|---|
| De-ionised water | 200 g |
| Surfactant A | 2.2 g |
| Precursor B | 2.2 g |

Precursor B is a methacrylic ester of a monomethyl ether of polyethylene glycol, mol.wt. 2000.
Seed Monomer Charge

| Methyl methacrylate | 10 g |
|---|---|
| Butyl acrylate | 10 g |

(iii) Seed Initiator
  Aqueous solution of ascorbic acid (0.05 g) in de-ionised water (2.5 g)
  Aqueous solution of hydrogen peroxide (20 vol; 0.48 g) in de-ionised water (2.5 g)
(iv) Monomer Feed I

| Methyl methacrylate | 48 g |
|---|---|
| Butyl acrylate | 68 g |
| Glycidyl methacrylate | 38 g |
| Surfactant A | 6.0 g |
| Precursor B | 9.0 g |

(v) Monomer Feed II

| Methyl methacrylate | 14.2 g |
|---|---|
| Butyl acrylate | 18.6 g |
| Glycidyl methacrylate | 9.9 g |
| Surfactant A | 1.7 g |

(vi) Feed Initiator
  Aqueous solution of ascorbic acid (0.52 g) in de-ionised water (38 g)
  Aqueous solution of hydrogen peroxide (20 vol; 4.99 g) in de-ionised water (34 g).

(b) The polymer "seeds" were prepared as described in Example 1(c). When the polymerisation reaction was over, Monomer Feed I and the feed initiator were added continuously with stirring at 40° C. under nitrogen over 170 minutes and the feed initiator over 200 minutes. When additional monomer Feed I was complete, monomer Feed II was then added continuously over 30 minutes and when the addition was finished, stirring was continued for a further 60 minutes.

(c) A coating composition can be prepared from the aqueous dispersion of polymer as described in Example 1(e).

EXAMPLE 3

A solution of 2-aminoethyl-3-aminopropyltrimethoxysilane (33% w/w in de-ionised water; 10 g) was added with stirring to a portion (20g) of the dispersion prepared as described in Example 1.

The composition so obtained was stored for 12 months at room temperature. A surface coated with a film produced from this composition was resistant to at least 100 rubs with a methylethylketone-soaked cloth even after storage.

EXAMPLE 4

A portion (20g) of the aqueous dispersion of polymer prepared as described in Example 1(b) to (d) was acidified to pH 1 with concentrated hydrochloric acid and mixed with a solution of 3-aminopropyltriethoxysilane (33% w/w in de-ionised water; 3.3g).

The resultant composition was stable on storage at room temperature for 12 months. A cured film produced from this composition on a glass plate was resistant to at least 100 rubs with a methylethylketone-soaked cloth even after storage.

We claim:

1. A waterborne coating composition comprising a sterically stabilized dispersion in an aqueous medium of a non-ionic film-forming polymer consisting of
  (i) an addition polymer, the chain of which comprises functional units containing an oxirane group and structural units derived from one or more ethylenically unsaturated monomers not containing oxirane groups and, associated therewith
  (ii) a steric stabilizing agent for the polymer; and an aminosilane of formula (1):

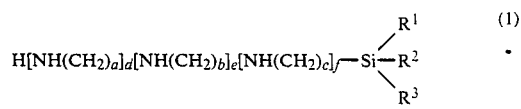

where a, b and c are from 2 to 4;
d and e are from 0 to 3;
f is from 1 to 3;
$R_1$ is $C_{1-3}$ alkyl or $C_{1-3}$ alkoxy and
$R_2$ and $R_3$ are $C_{1-3}$ alkoxy.

2. A composition according to claim 1 containing at least 5% by weight of functional units.

3. A composition according to claim 2 containing from 15 to 30% weight of functional units.

4. A composition according to claim 1 where the functional unit is derived from glycidyl acrylate or glycidyl methacrylate.

5. A composition according to claim 1 where the structural units are derived from methyl methacrylate and butyl acrylate.

6. A composition according to claim 1, where the steric stabilizing agent for the disperse phase film-forming polymer is a block or graft copolymer at least one polymeric component of which is solvatable by the aqueous medium of the dispersion and another polymeric component of which is not solvated by that medium and is associated with the polymer.

7. A composition according to claim 1, where the steric stabilizing agent is derived from a precursor, the molecule of which comprises at least one poly(oxyethylene) chain and at least one double bond capable of copolymerizing with the monomers.

8. A composition according to claim 7 where the precursor is accompanied by a non-ionic surfactant.

9. A composition according to claim 8, where the non-ionic surfactant is a poly(oxyethylene) alkylaryl ether.

10. A composition according to claim 7, where the precursor itself has surfactant properties and has a hydrophobic portion consisting of oxyalkylene units containing 3 or more carbon atoms and a terminal hydrophilic portion consisting of the poly(oxyethylene) chain.

11. A composition according to claim 10 where the precursor has the formula (4):

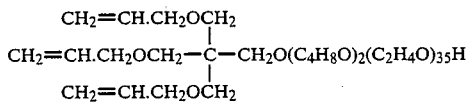

(4)

12. A composition according to claim 1 where, in the compound of formula (1), a and b are 2.

13. A composition according to claim 1 where c is 3.

14. A composition according to claim 1 where d is 0.

15. A composition according to claim 1 where e is 0 or 1.

16. A composition according to claim 1 where f is 1.

17. A composition according to claim 1 where the molar ratio of oxirane groups to aminosilane groups is in the range 5:1 to 1:2.

18. A composition according to claim 17, where the molar ratio of oxirane groups to aminosilane groups is 2:1.

19. A method of coating a surface which comprises applying to the surface a thin layer of a composition as claimed in claim 1 and allowing the water to evaporate.

* * * * *